United States Patent
Hammock et al.

(10) Patent No.: US 11,620,626 B2
(45) Date of Patent: Apr. 4, 2023

(54) SYSTEM AND METHOD FOR AUCTIONING A FIRST-IN-WALLET PAYMENT ACCOUNT STATUS

(71) Applicant: Capital One Services, LLC, McLean, VA (US)

(72) Inventors: Luke A. Hammock, Washington, DC (US); Janusz Michael Niczyporuk, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 50 days.

(21) Appl. No.: 17/405,052

(22) Filed: Aug. 18, 2021

(65) Prior Publication Data
US 2021/0383350 A1 Dec. 9, 2021

Related U.S. Application Data

(63) Continuation of application No. 14/205,955, filed on Mar. 12, 2014, now Pat. No. 11,200,555.
(Continued)

(51) Int. Cl.
*G06Q 20/00* (2012.01)
*G06Q 20/22* (2012.01)
(Continued)

(52) U.S. Cl.
CPC .......... *G06Q 20/227* (2013.01); *G06Q 20/36* (2013.01); *G06Q 20/367* (2013.01); *G06Q 30/06* (2013.01); *G06Q 30/08* (2013.01)

(58) Field of Classification Search
USPC ............ 705/41, 39, 40, 37, 38, 26; 235/380, 235/379; 709/227; 726/9, 6
See application file for complete search history.

(56) References Cited

U.S. PATENT DOCUMENTS

| | | | | |
|---|---|---|---|---|
| 6,999,943 B1* | 2/2006 | Johnson | ............... | G06Q 40/025 705/37 |
| 7,546,945 B1* | 6/2009 | Bucci | ..................... | G06Q 40/00 235/379 |

(Continued)

OTHER PUBLICATIONS

M-Payment systems: Technologies and business models; 2014 Euro Med Telco Conference (EMTC) (pp. 1-6); Alessandro Vizzarri; Francesco Vatalaro; Nov. 12, 2014. (Year: 2014).*

(Continued)

*Primary Examiner* — Tien C Nguyen
(74) *Attorney, Agent, or Firm* — Troutman Pepper Hamilton Sanders LLP; Christopher J. Forstner; John A. Morrissett

(57) ABSTRACT

A system and method in accordance with exemplary embodiments may include systems and methods for providing first-in-wallet payment account auctioning. In an exemplary embodiment, a method for providing first-in-wallet payment account auctioning includes, receiving, via a network, consumer preference data, current consumer financial situation data associated with a plurality of payment accounts, and account terms associated with each of the plurality of payment accounts; scoring each of the plurality of payment accounts based on the consumer preference data, the current consumer financial situation data, and the account terms and determining an optimal payment account to be the first-in-wallet account out of the plurality of payment accounts based on the scoring.

20 Claims, 6 Drawing Sheets

Related U.S. Application Data

(60) Provisional application No. 61/777,268, filed on Mar. 12, 2013.

(51) Int. Cl.
*G06Q 20/36* (2012.01)
*G06Q 30/08* (2012.01)
*G06Q 30/06* (2023.01)

(56) References Cited

U.S. PATENT DOCUMENTS

| | | | | |
|---|---|---|---|---|
| 7,797,207 B1* | 9/2010 | Dilip | ............ | G06Q 40/02 705/40 |
| 8,086,507 B1* | 12/2011 | Alder | ............ | G06Q 40/12 705/37 |
| 8,370,265 B2* | 2/2013 | Coulter | ............ | G06Q 20/108 380/247 |
| 8,412,624 B2* | 4/2013 | Scherpa | ............ | G06Q 40/00 705/39 |
| 8,560,447 B1* | 10/2013 | Hinghole | ............ | G06Q 20/14 705/40 |
| 8,595,101 B1* | 11/2013 | Daukas | ............ | G06Q 40/02 705/7.29 |
| 9,092,767 B1* | 7/2015 | Andrews | ............ | G06Q 10/067 |
| 2004/0128236 A1 | 7/2004 | Brown et al. | | |
| 2004/0215560 A1* | 10/2004 | Amalraj | ............ | G06Q 20/04 705/40 |
| 2005/0182720 A1* | 8/2005 | Willard | ............ | G06Q 20/102 705/40 |
| 2007/0162387 A1* | 7/2007 | Cataline | ............ | G06Q 20/10 705/40 |
| 2008/0021813 A1 | 1/2008 | Simpson et al. | | |
| 2008/0162343 A1* | 7/2008 | Bedier | ............ | G06Q 20/12 705/35 |
| 2009/0012889 A1* | 1/2009 | Finch | ............ | G06Q 20/102 705/35 |
| 2009/0018923 A1* | 1/2009 | Chen | ............ | G06Q 20/105 705/40 |
| 2009/0164366 A1* | 6/2009 | Blythe | ............ | G06Q 20/28 705/39 |
| 2009/0276368 A1* | 11/2009 | Martin | ............ | G06Q 40/02 705/36 R |
| 2010/0017275 A1* | 1/2010 | Carlson | ............ | G06Q 50/30 705/13 |
| 2010/0017325 A1* | 1/2010 | Scherpa | ............ | G06Q 20/10 705/35 |
| 2010/0217674 A1* | 8/2010 | Kean | ............ | G06Q 40/12 705/17 |
| 2012/0221420 A1* | 8/2012 | Ross | ............ | G06Q 40/00 705/16 |
| 2012/0232968 A1* | 9/2012 | Caiman | ............ | G06Q 20/322 705/14.4 |
| 2012/0290609 A1* | 11/2012 | Britt | ............ | G06Q 20/20 707/769 |
| 2013/0110668 A1* | 5/2013 | Hart | ............ | G06Q 30/00 705/26.5 |
| 2014/0058912 A1* | 2/2014 | Bajaj | ............ | G06Q 40/00 705/35 |
| 2015/0124958 A1* | 5/2015 | Sheldon | ............ | G06Q 40/02 379/266.07 |
| 2015/0154570 A1* | 6/2015 | Dheer | ............ | G06Q 40/02 705/44 |

OTHER PUBLICATIONS

Next generation smart transaction touch points; 2014 14th International Conference on Advances in ICT for Emerging Regions (ICTer) (pp. 96-102); K V Kuganathan; Gihan N. Wikramanayake; Dec. 10, 2014. (Year: 2014).*

Lee, Z. et al., "An analysis and comparison of different types of electronic payments systems," PICMET '01. Portland International Conference on Management of Engineering and Technology; Jan. 1, 2001. (Year: 2001).

Pousttchi, K. et al., "Analyzing the Elements of the Business Model for Mobile Payment Service Provision," International Conference on the Management of Mobile Business (ICMB 2007) (p. 44); Apr. 21, 2008. (Year 2008).

* cited by examiner

SYSTEM AND METHOD FOR AUCTIONING A FIRST-IN-WALLET PAYMENT ACCOUNT STATUS

CROSS-REFERENCE TO RELATED APPLICATIONS

This application is a continuation of, and claims priority under 35 U.S.C. § 120 to, U.S. patent application Ser. No. 14/205,955, filed Mar. 12, 2014, which claims priority to U.S. Provisional Patent Application No. 61/777,268, filed on Mar. 12, 2013, the entire contents of which is incorporated herein by reference.

FIELD OF THE DISCLOSURE

The present disclosure relates to systems and methods for auctioning a first-in-wallet (FIW) payment account status.

BACKGROUND OF THE DISCLOSURE

Consumers have a variety of payment options and/or stored value accounts. For example, consumers may use a credit card, a debit card, a prepaid card, a demand deposit account (DDA), a gift card, a loyalty card, an e-commerce payment method that is linked to a payment account, such as PayPal, or the like when making a payment. These payment options may also include a variety of selections to further customize a payment. By way of example, these selections may include a pay-now option, a pay-later option, an access credit account, an access funded account, a rewards level selection, an interest rate on credit selection, a selection of charge placed on the merchant, a discount selection, a promotional payment selection, and/or an authentication requirement selection.

Currently, payment account providers provide consumers with payment terms, such as rewards, interest rates, payback terms, and funding availability. These are provided in an opaque, high latency structure so that payment account providers are not aware of other payment account providers, discounts, offers, and advertisements that these account providers may present to an account holder. As a result of this structure, payment account providers are not able to dynamically alter payment terms to remain competitive with the other payment account providers.

From the consumer perspective, payment options can at times be overwhelming, causing a consumer to randomly or nonsensically choose a method of payment and/or continuously resort to a specific method of payment based on stagnant terms. These and other drawbacks exist.

SUMMARY OF THE DISCLOSURE

Various embodiments of the present disclosure provide systems and methods for auctioning a FIW payment account status. In an exemplary embodiment, a method for auctioning a FIW payment account status may include receiving various payment options and specifications, receiving consumer preferences and current financial situation data, receiving new payment terms associated with each payment option, including any applicable discounts, promotions, offers, and the like, comparing payment options based on payment terms, consumer preferences, and current financial situation data, and transmitting a most favored payment option.

The method may further include associated weights with each consumer preference and current financial situation data, such that the comparison is based on weighted consumer preferences and weighted current financial situation data.

The method may also include determining a FIW account status that is selected and applied for a given transaction, for a predetermined amount of time, or until an event triggers generation of a new FIW account status.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
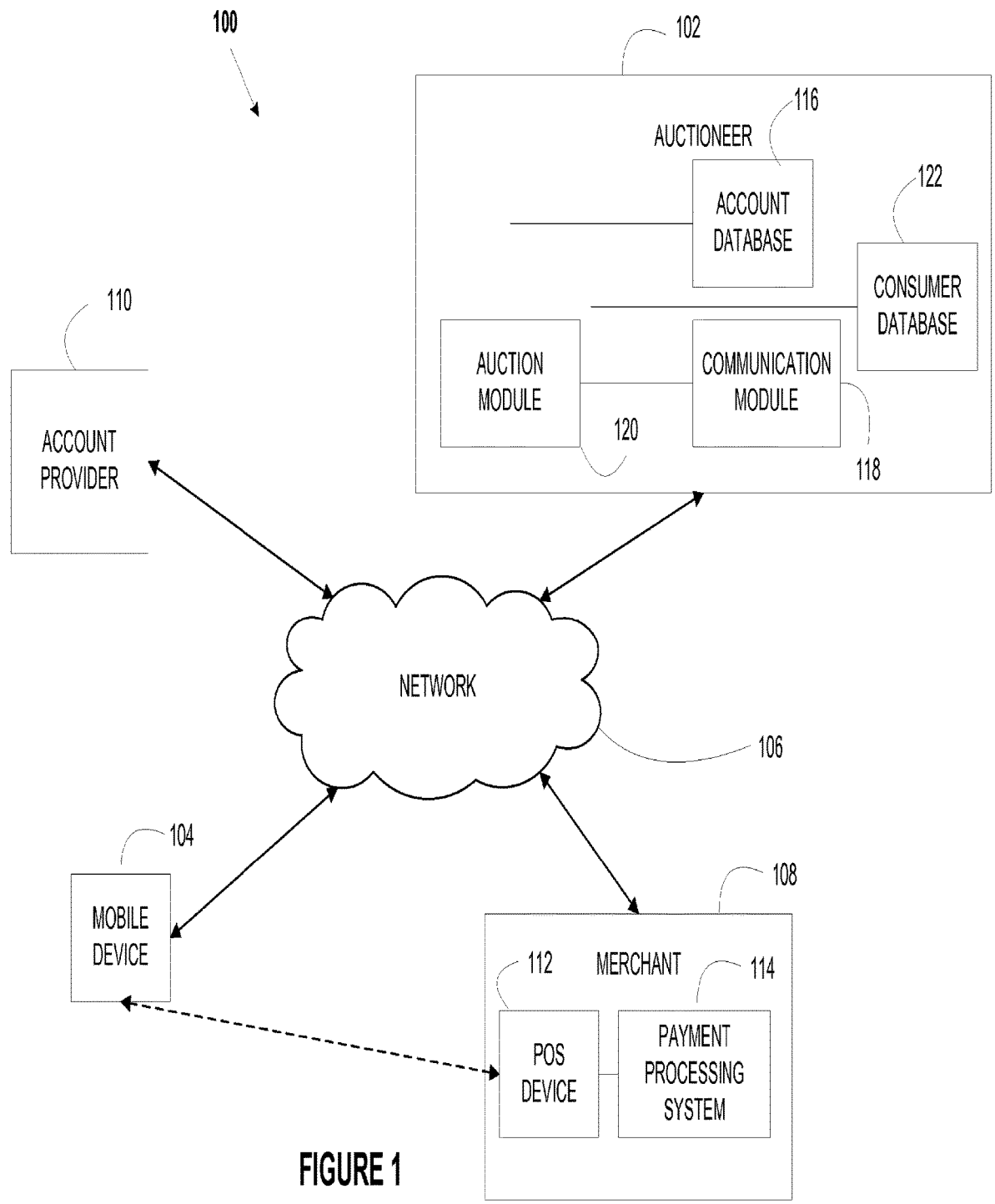
FIG. 1 depicts an exemplary embodiment of a First-In-Wallet auctioning system.

The following description is intended to convey a thorough understanding of the embodiments described by providing a number of specific exemplary embodiments and details involving systems and methods for providing First-In-Wallet auctioning systems and methods. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only and can be extended to any entity that provides consumers with a payment account, including e-commerce payment method linking to a particular payment account.

According to the various embodiments of the present disclosure, systems and methods enable a First-In-Wallet auctioning system using, for example, a mobile device. A First-In-Wallet ("FIW") auctioning system may include, for example, a system that may determine a default payment account which may be changeable by a consumer, a default payment account that is not changeable by a consumer, and a top of wallet payment account, where the account may become visible to a consumer as the first or primary account in a menu that a consumer may select.

The exemplary use of "mobile device" throughout the application is only by way of example, and the attachment may also be used with personal computers, televisions, gaming systems, telephone, or any other device capable of making a connection with an auctioneer system as described below. Additionally, a FIW status may be associated with an account and thus, any form of payment using the account will be a payment using a FIW status account, regardless of whether it is a payment by NFC via a Secure Element, a magnetic strip card, a payment stored in cloud computing, a mobile wallet, or the like.

The various embodiments of the FIW auctioning system and methods may be provided in an online environment, whereby, for example, an auctioneer system may receive various consumer payment options and specifications, consumer preferences, and current consumer financial situation data. The auctioneer system may also receive payment terms associated with each received consumer payment option. The auctioneer system may then compare consumer payment options based on payment terms, consumer preferences, and current consumer financial situation data, and transmit a most favored payment option. The transmitted most favored payment option may then assume the status of First-in-Wallet (FIW) for a consumer, and such status may be recorded, for example, in a mobile device used for payment.

In various embodiments of the FIW auctioning system and methods, a determination of a FIW account may be for a single mobile wallet, where the mobile wallet includes a plurality of accounts. Also, a determination of a FIW account may be at a consumer level, where a consumer may have a plurality of mobile wallets and a FIW account may be determined for each respective mobile wallet. Moreover, in various embodiments a determination of a FIW account may occur on a transaction-by-transaction basis or a FIW account determination may be fixed for a predetermined time period, a predetermined number of transactions, or a specific geographic area or merchant. Allowing a determination of a FIW account to be dynamic may optimize consumer rewards or discounts by taking into considerations transaction rewards, discounts, co-recurring transactions, and basket or shopping cart totals, which may result in a different desired FIW account by merchant, merchant category, date, time of day, or location.

The mobile device used for payment may include a mobile wallet, whereby once a FIW status has been associated with a payment option residing in the mobile wallet, the FIW payment option may be used in an offline manner, whereby a previously-provided FIW status may be used for a certain period of time, regardless of whether the mobile device is connected to a communication network at the time of use.

In an exemplary embodiment, the FIW auctioning system and methods may include software and/or application programming interfaces (APIs) to enable the mobile device to participate in commercial transactions to use a payment option selected as FIW. Accordingly, the mobile device may include APIs to enable mobile contactless payments (using Near Filed Communications ("NFC"), barcodes, or the like), remote electronic payments, and person-to-person payments (both proximity and remote). The system and software may allow for multiple cards, accounts, or other information portions to be stored, including a history of FIW status associated with each account, and may allow simultaneous access to all, or switch between the individual options.

FIG. 1 depicts an exemplary system 100 for use with FIW auctioning and payment. System 100 may include an auctioneer system 102, a mobile device 104, a network 106, a merchant system 108, and an account provider system 110.

Network 106 may enable communication between mobile device 104, auctioneer system 102, account provider system 110, and merchants 108. For example, Network 106 may be one or more of a wireless network, a wired network or any combination of wireless network and wired network. For example, network 106 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.1 In and 802.11 g or any other wired or wireless network for transmitting and receiving a data signal.

In addition, network 106 may include, without limitation, telephone lines, fiber optics, IEEE Ethernet 902.3, a wide area network ("WAN"), a local area network ("LAN"), or a global network such as the Internet. Also network 206 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more embodiments, network 106 may comprise a plurality of interconnected networks, such as, for example, the Internet, a service provider's network, a cable television network, corporate networks, and home networks.

Auctioneer system 102 may include, for example, an account database 116, a communication module 118, an auction module 120, and a consumer database 122. Account database 116 may maintain information relating to the accounts of consumers associated with a FIW auction. Information relating to the accounts of consumers associated with a FIW auction may include, for example, account provider; account terms and conditions, such as interest rates, annual percentage rates, fees, and payment schedules; account balance; a credit limit, if applicable; account transaction history; account payment history; average account balance; average monthly transactions; average yearly transactions; account expiration data; account number; account security data; account rewards data; average monthly account rewards; average yearly account rewards; and consumed rewards.

As referred to herein, an account may include, for example, a prepaid card account, stored value card account, debit card account, check card account, payroll card account, gift card account, prepaid credit card account, charge card account, checking account, rewards account, line of credit account, credit account, e-commerce payment method linking to a particular account, or any other account for paying for a transaction in a commercial system 100. Account database 116 may also include an association of payment data with respective consumers. For example, account database 116 may include an association of a token "123456" with account number "1234 5678 9012 3456," which belongs to John Q. Cardholder. Account database 116 may also include specifications associated with an account such as account rewards, account terms, including rewards terms, interest rates, late fees, and the like, current account status, and fees associated with the account. As will be described in more detail below, account database 116 may be accessed for authorizing transactions and or payment requests.

Communication module 118 may enable communication between the components of system 100. Communication module 118 may include hardware, software, and/or firmware that may enable communication between an auctioneer system 102 and other components of system 100 using network 106. For example, communications module 118 may include an input/output interface and an input/output device driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data.

Consumer database 122 may include additional data elements that may be used in the auction module in order to determine a FIW account status. For example, consumer database 122 may include data such as consumer preferences including, but not limited to, speed of payment, merchant discount rate, consumer purchase history, ideal length of repayment, level of interest in improving credit scores, level of acceptance of potential financing charges or interest rates, customer service history, customer service desires, rewards or loyalty program preferences, consumer online browsing history, historical consumer purchase method, or the like. Consumer database 122 also may include current financial situation data such as demand deposit account, funding availability, bill payments due (including a purchase history associated with the bill payments due), credit score, expected time of a new deposit and/or withdrawal, ratings/reviews/consumer reports about a set of payment account providers, or other financial situation data that may be relevant in determining which account to use for payments.

Auction module 120 may include business logic and optimization methods used to determine which account associated with a consumer should be assigned a FIW status. For example, auction module 120 may include executable programs that compare payment terms from account providers while taking into account consumer preferences and financial situation data that may be stored in the consumer database 122. By way of example, auction module 120 may weight payment account provider terms according to computer preferences and financial situation data stored in the consumer database 122.

Auction module 120 may execute at predetermined times such that account providers may provide updated account terms on a specified schedule. Additionally, account module 120 may execute for individual transactions, transactions at a given merchant or location, transactions for a specified date and/or time range, and/or transactions for a predetermined amount.

Once a FIW status has been determined and associated with an account, the FIW status may be communicated to the account holder, for example, via the account user's mobile device 104. In addition to the FIW status that may be transmitted to the consumer who is the account holder, new card application offers may be transmitted that provide the consumer with new payment opportunities, such as, for example, a new credit card application. In this way, new payment accounts may be established by the consumer, where the new payment accounts provide optimal terms, discounts, rewards, and/or offers to the consumer. The new card applications may be selected based on the consumer preferences, current consumer financial situation data, historical FIW account statuses, consumer purchase histories, as well as any other data that may be stored in the account database 116 and/or the consumer database 122.

Where a FIW status cannot be determined, a tie has occurred in determining a FIW status, and/or a consumer preference indicates that the consumer would like to be presented with the option to make the final determination of a FIW account status, a consumer may be prompted, via, for example, a mobile device, to select a an account and designate that account as having FIW status. The, prompt also may display a FIW score associated with each consumer account.

In order to determine a FIW score, a weight may be associated with each consumer preference and current consumer financial situation data such that when the consumer preferences and current consumer financial situation data are used to determine the desirability of the terms of an account to be a FIW account, a FIW score is generated. The weights associated with each consumer preference and current consumer financial situation data may be altered or revised based on consumer input so that a consumer may override automatic determinations of weights to associate with each consumer preference and current consumer financial situation data. The auction module 120 may utilize auction rules to determine the FIW score associated with an account.

By way of example, a consumer preference may designate interest rate as being more important than rewards points and give interest rate a weight of 9 (out of 10) and rewards points a weight of 5 (out of 10). Based on consumer preferences and current consumer financial situation data, account terms that include an interest rate of 0% to 0.4999% may be given a rank of 10 (out of 10), terms that include an interest rate of 2.5% to 3.5% may be given a rank of 7 (out of 10), and so on. Additionally, by way of example, based on consumer preferences and current consumer financial situation data, account terms that include 1 reward point per dollar may be given a rank of 7, terms that include 3 rewards points per dollar may be given a rank of 9. Each of the account terms also may be ranked or scored based on a default or predetermined ranking or scoring algorithm as well. Using the above example data, if the terms received from account providers systems 110 indicate that a 0% interest rate card only provides 1 rewards point per dollar and a 2.5% interest rate account provides 3 rewards points per dollar, their FIW scores (should they be based solely on these two factors) would be 125 and 101, respectively, giving the 0% interest rate card the FIW status.

FIW status would indicate that any subsequent purchases would be made using the FIW payment method (i.e., payments would be routed over the FIW payment account). Should the consumer designate such, all non-FIW payment accounts may not be used for purchases until a new FIW status is determined. A new FIW status may be determined on a transaction basis, such that at each authorization request, a FIW status may be determined; on a predetermined time period, such that, for example, each month a FIW status is determined; or at a particular event that may trigger FIW determination, such as, for example, a bill payment, or the addition of a new payment account.

In addition to account provider systems 110 providing information to the auctioneer system 116 to determine a FIW status, merchant systems 108 may be able to provide partnering opportunities and or offers to either the auctioneer system 102 directly and/or the account providers systems 110. By way of example, a merchant or business may partner with a consumer's existing payment account in order to provide, for example, discounts, offers, and/or promotions associated with the particular existing payment account. Moreover, a merchant or business may provide their own payment accounts, such as a merchant credit card, which may already exist as a payment method for a particular consumer and thus, be in the subset of payment accounts that are analyzed when determining FIW status. Additionally, a merchant or business may submit a new offer for a payment account to a consumer in, for example, a merchant or business new card application. Thus, should a merchant and or other business desire to partner with an existing account provider and/or submit their own offer in, for example, a merchant or business new card application offer, the terms associated with the partnered account, existing payment account, and/or new card application, may be used in the auction module 120 to determine a FIW score associated with the newly partnered account, existing payment account, and/or new card application.

Additionally, merchants and/or businesses may provide offers associated with specific account providers or specific accounts, as well as to a group of account providers or accounts, such as, for example, all Visa® customers. These offers also may be presented to the auction module 120 and used in a FIW score calculation. These offers also may be presented to a consumer, via, for example, a mobile device 104, when the consumer uses and/or selects an account for use in payment.

Any consumer and/or business offer may be related to transactions made, and may include discounts, advertising, coupons, or any other offer. The offers also may be based on transaction history, frequency, or location. The offers also may be based on a consumer's indicated desires or the location of a consumer. The offers may be selected by incorporating information from other sources, which may then be stored in the consumer database 122 for example, using previously shown offers, past consumer transactions, consumer preference settings, geographic travel patterns, or any other information. The offers also may be presented when transactions are identified through other methods, such as using scanned receipts, photographs of a purchased products, downloaded transaction records, or other ways to identified a product or service purchased by a consumer.

Merchant 108 may include a Point of Sale (PoS) device 112 and a payment processing system 114. In various embodiments, PoS 112 may be any device that may receive payment instructions from the mobile phone or any other payment device, such as, for example, NFC communication, which can be utilized to process payment transactions. Moreover, PoS 112 may receive payment instructions from any payment method, such as, a traditional magnetic strip payment cards, payment cards with secure chip technology, and the like. PoS device 112 may be for example, PoS devices made by VeriFone®, Ingenico® and/or any other like devices. As illustrated in FIG. 1 by the dotted line connecting mobile device 104 to PoS device 112, mobile device 104 may be communicatively coupled with PoS device 112 using near field communication ("NFC"). A PoS device 112 also may be any device capable of receiving and transmitting payment and transaction information from any payment method. By way of example, payment options may include mobile contactless payments, remote electronic payments, magnetic strip payments, secure chip technology payments, person-to-person payments, and the like. In an exemplary embodiment, PoS device 112 may be capable of utilizing standardized transmission protocols, for example but not by way of limitation, ISO/IEC 14443 A/B, ISO/IEC 18092, MiFare, FeliCa, tag/smartcard emulation, and the like. Also, PoS device 112 may be able to utilize transmission protocols and methods that are developed in the future using other frequencies or modes of transmission. PoS device 112 may also be backwards-compatible with existing payment techniques, for example RFID. Also, the system may support transmission requirements to meet new and evolving payment standards including internet based transmission triggered by NFC.

Payment processing system 114 may allow merchant 108 to request and process payments, for example. Payment processing system 114 may utilize network 106 to communicate payment requests to auctioneer system 102 and/or the account provider system 110 and receive authorization requests. In some instances, the auctioneer system 102 may be associated with a financial institution or account provider 110, and may authorize payments directly. In other instances, the auctioneer system 102 may be an external system from any account provider system 110. In communicated payment requests, payment processing system 114 may transmit information to auctioneer system 102 and/or account provider system 110 using, for example, networks maintained by Visa®, MasterCard®, Discover®, American Express® and the like.

Figure 1A:
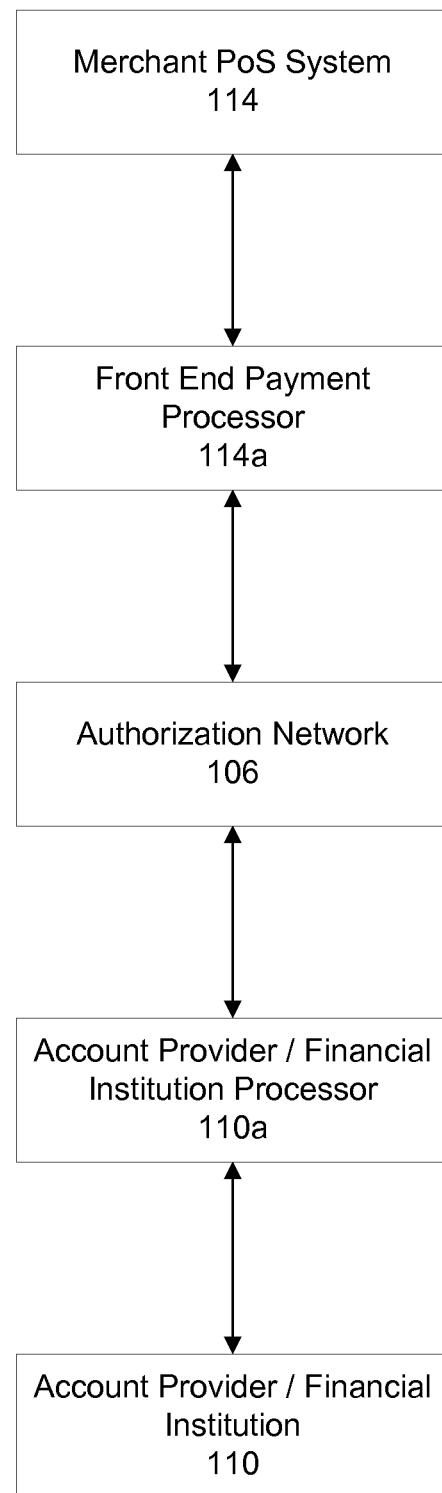
FIG. 1A depicts an exemplary embodiment for payment processing.

As illustrated in FIG. 1A for example, payment processing system may allow merchant to submit payment authorization requests and process payments. An authorization network 106 may be used to communicate payment requests from a merchant system 108 to an issuing financial institution or account provider 110 as well as payment determinations from the issuing financial institution or account provider 110 to the merchant system 108. An authorization network may include, for example, networks maintained by Visa®, MasterCard®, Discover®, American Express® and the like. In communicated payment requests, payment processing system 114 may pass transaction information, which includes payment information, to a frontend payment processor 114a that maintains connections with a variety of networks 106 connected to financial institutions or account providers 110, such as card associations, banking institutions, and other settlement service providers. The front-end payment processor may pass along the transaction information to the appropriate network 106, which may then route the transaction information to the issuing financial institution or account provider processor (or a back-end payment processor) 110a. The issuing financial institution or account provider processor 110a may check the payment and transaction details in order to approve (or deny) payment. The issuing financial institution or account provider 110 may concurrently verify a payment for the received transaction information. The verification of payment (or denial of payment) may then be sent from the issuing financial institution or account provider 110 via the issuing financial institution or account provider processor 110a through the network 106 and front-end processor 114a to the merchant system 108.

The authorization system illustrated in FIG. 1A may be used to both perform real-time authorization as well as batch payment processing. In a batch payment processing system, the issuing financial institution or account provider processor 110a may perform a payment authorization in real-time and then subsequently process the payment at the issuing financial institution or account provider 110 in batch processing.

In an exemplary embodiment, the system 100 may allow for social networking functionality. In some embodiments, a consumer may interact with an account provider, by, for example "liking" a FIW account provider and or related account provider products, such as for example, an American Express® Starwood Preferred Guest® Credit Card, on a social networking website, which may be connected to the mobile device 104 over the network 106. Where a consumer interacts with an account provider using social media, the account provider may include an offer or additional reward to that consumer in a subsequent transmission of account terms associated with that consumer. For example, where a consumer "likes" a social network page associated with an account provider, the account provider may transmit a $5 refund offer associated with the next $50 the consumer spends using an account associated with the account provider. In another example, where a consumer follows an account provider using a social network site, such as Twitter, the consumer may be sent discounts at participating retailers when the consumer uses an account associated with the followed account provider.

Figure 2:
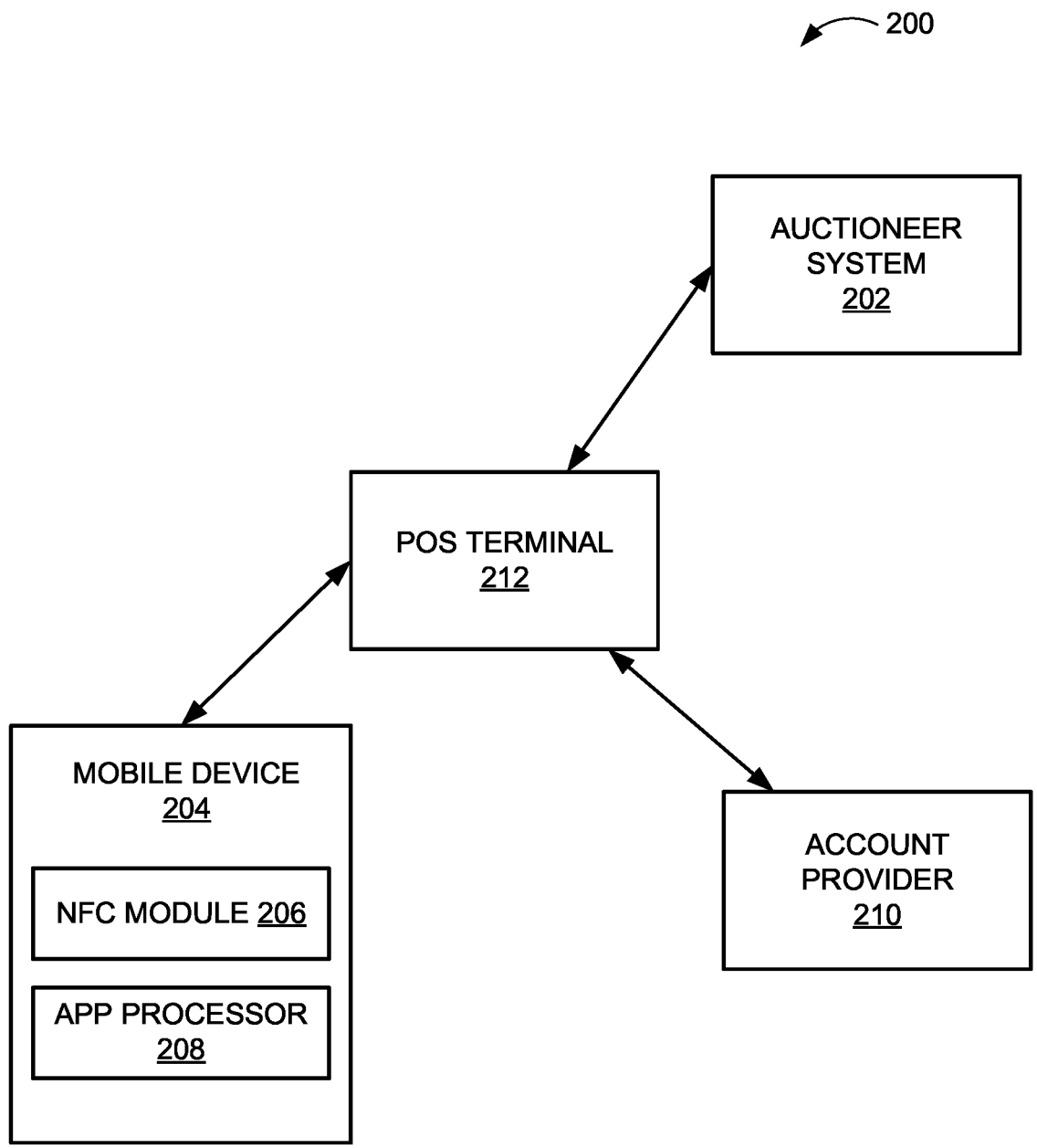
FIG. 2 depicts an exemplary embodiment of a First-In-Wallet auctioning system.

FIG. 2 depicts an exemplary system 200 for use with FIW auctioning and payment methods. As depicted in FIG. 2, system 200 may include a mobile device 204, a point-of-sale (PoS) terminal 212, and an account provider system 210, which also may be an auctioneer system 202. Mobile device 204, PoS terminal 212, account provider system 210, and auctioneer system 202 of FIG. 2 are similar to mobile device 104, PoS terminal 112, account provider system 110, and auctioneer system 102 of FIG. 1, respectively. Mobile device 204 may be any mobile device capable of accessing the internet, and in the instance where the mobile device is used for mobile wallet capabilities, the mobile device 104 may be any mobile device capable of executing a payment. For example, mobile device 204 could be an iPhone, iPod, iPad from Apple® or any other mobile device running Apple's iOS operating system, any device running Google's Android® operating system, any device running Microsoft's Windows® Mobile operating system, and/or any other smartphone or like device.

Mobile device 204 may include for example, a Subscriber Identity Module (SIM) card, an NFC module 206, and an App Processor 208. The SIM card may be an integrated circuit that securely stores the service-subscriber key (IMSI) used to identify a subscriber on mobile telephony devices (such as mobile phones and computers). The NFC module 206 may be an embedded NFC chip that can send encrypted data a short distance ("near field") to a reader located, for instance, next to a retail cash register or like PoS device. The App Processor 208 may enable execution of software applications on mobile device 204. In various embodiments, the App Processor 208 may cooperate with the NFC module 206 to enable a payment using mobile device 204. Additionally, mobile device 204 may include an attachment for contactless payments (not shown), such as a contactless payment attachment that plugs into an audio jack or plug of a mobile device.

The App Processor 208 of the mobile device 204 may enable executing of a FIW auctioning application, which may include various user interfaces. The FIW auctioning application and associated user interfaces may leverage transaction data, wireless data connection, over-the-air data connection, or other means of data transmission. The data used in the application may be transmitted from external data sources, such as an account provider 210 and/or an auctioneer system 202. For example, the application and user interface may leverage information stored in the consumer database 122 and/or information stored in the account database 116 as well as merchant data, such as data about the products and/or services being purchased, information about the merchant and/or other parties involved in a transaction, promotional information, advertising information, or other useful information.

Mobile device 204 also may include various software components to facilitate a FIW auctioning application For example, mobile device 204 may include an operating system such as, for example, the iOS operating system from Apple, the Google Android operating system, and the Windows Mobile operating system from Microsoft. Mobile device 204 may also include, without limitation, software applications such as mobile banking and mobile wallet applications to facilitate a FIW auctioning application, an NFC application programming interface, and software to enable touch sensitive displays. Mobile device manufacturers may provide software stacks (e.g., APIs) which may allow software applications to be written on top of the software stacks. For example, mobile device manufacturers may provide, without limitation, a card emulation API to enable NFC card emulation mode, a logic link control protocol (LLCP) API for peer-to-peer communication between mobile devices, and a real-time data (RTD) API and a NFC Data Exchange Format (NDEF) API for reading/writing.

Figure 3:
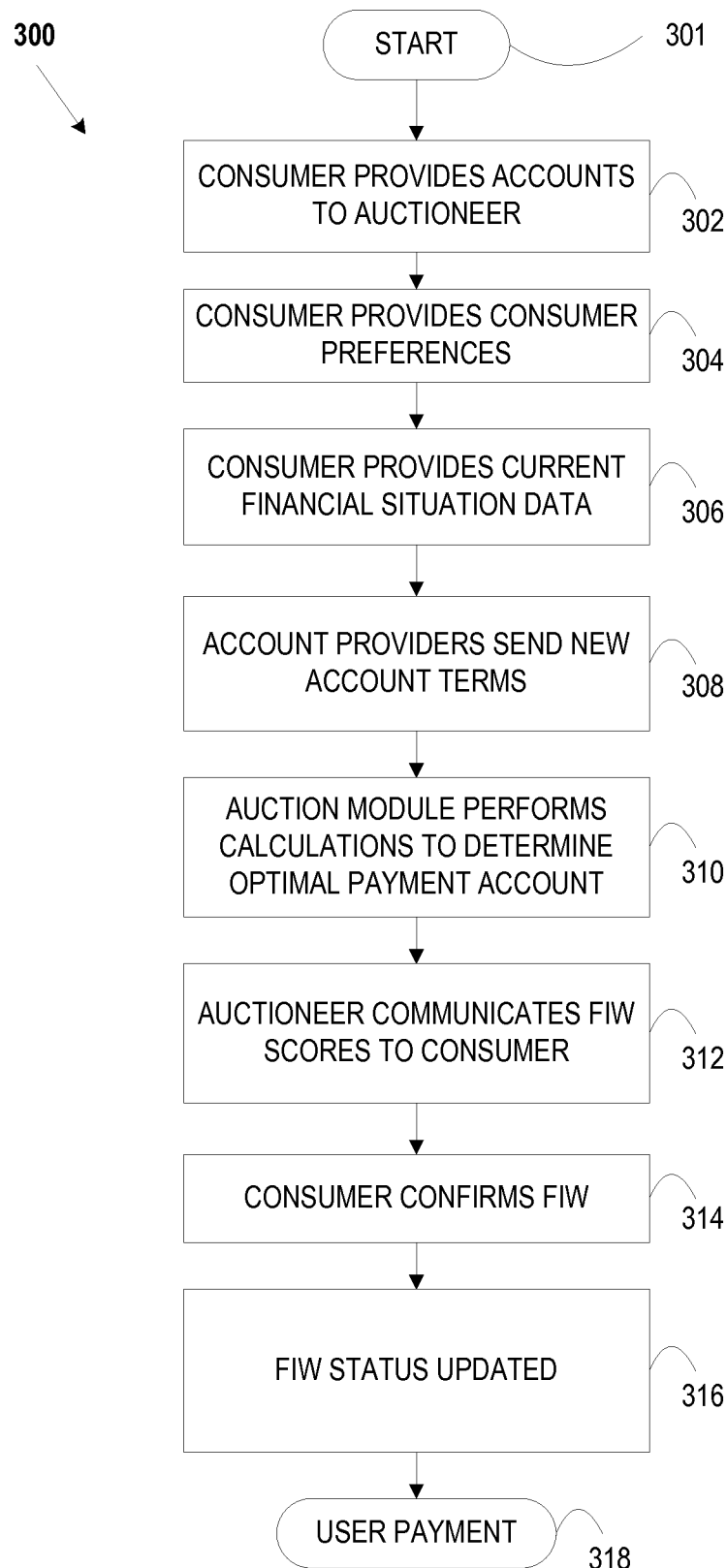
FIG. 3 depicts an exemplary embodiment of a First-In-Wallet auctioning system.
Figure 4:
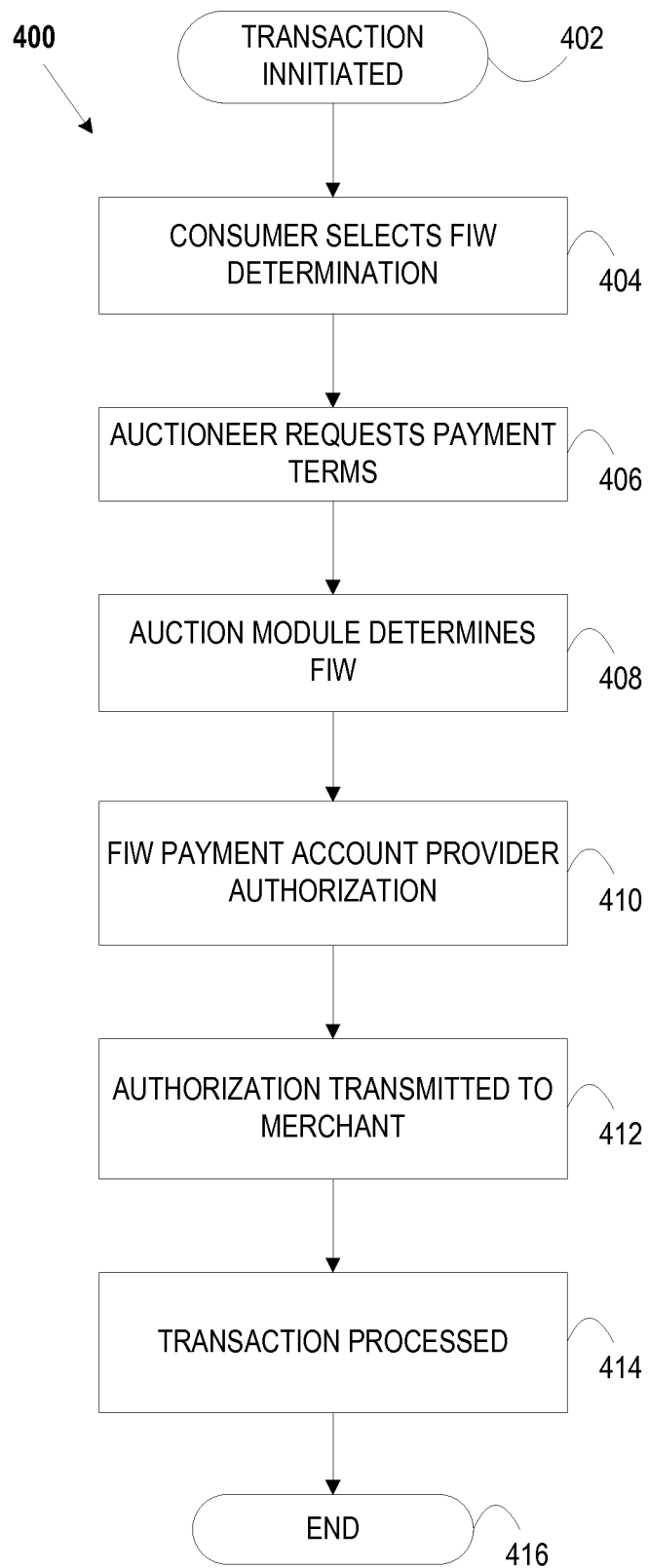
FIG. 4 depicts an exemplary embodiment of a First-In-Wallet auctioning method.

FIGS. 3 and 4 provide exemplary methods for providing a FIW auctioning and payment. Method 300, depicted in FIG. 3, may begin in block 301.

In block 302, account data may be provided to an auctioneer system. In various embodiments, a consumer may input the account data into a mobile device 104, for example. A consumer may also provide account data using pre-stored account data in, for example, a mobile wallet or cloud storage and/or accessing an account provider system 110 such that the account provider may deliver the account data. Also, account information may be provided using a simple credit card, or the like, whereby the credit card is swiped and the account information stored in, for example, a magnetic strip, is provided to the auctioneer system 102. Account information may include, for example, account owner data, account rewards, account terms, current account status, current account balance, current account limit, such as a credit limit, transaction histories, account fees, and the like.

In block 304, the consumer may provide consumer preferences to an auctioneer system 102 to be stored in, for example, a consumer database 122. Consumer preferences may include, for example, preferences associated with speed of payment, merchant discount rates, rewards options, account preferences and ranking of account terms, such as fees and interest rates associated with the account, and the like. Consumer preferences may be entered in a free-form using, for example a mobile device 104. Consumer preferences also may be selected from various options provided by the auctioneer system 102 to the consumer, via, for example, a mobile device. The various options may be to answer a question, such as "Do you belong to any of the following? (a) Student Advantage; (b) AAA; (c) a Teachers' Association; or (d) None" which may provide merchant discounts based on membership; rank various features, such as "Please rank the following, using 10 as the most important and 1 as the least important: rewards points, interest rate, billing date, account balance, etc."; and/or selecting a level of overall importance, such as "On a scale of 1 to 10, how important is it that you maximize your rewards?". Consumer preferences may also be provided, from a third party system (not shown) that may analyze transaction histories to determine a predicted consumer preference associated with the transaction histories.

In block 306, the consumer provides current financial situation data, such as account name and type, for example, a personal demand deposit account, and account details, such as available funding, bill payments due, expected date and time of incoming deposits and/or withdrawals, or the like. Current financial situation data may also be provided by the account providers, with which the consumer maintains an account.

In block 308, account providers send new account terms associated with each existing account to the auctioneer system 102. The account providers may also send new card applications to be processed in the auction mobile 120 of the auctioneer system 102, so that new card applications may be given a FIW score, which may then be sent to a consumer for consideration as a FIW account. In the method depicted in FIG. 3, the account providers may send the new account terms and/or new card applications at a specified time and/or date, such that a FIW status is determined, for example, on Monday of every week.

Moreover, account providers who may be sending new account terms (including any offers, discounts, and/or promotions) associated with each account, may base the account terms on a particular consumer, or a group of consumers. In this manner, account providers may essentially bid on existing consumers by providing account terms that are likely to win over certain consumers. By way of example, account providers may desire to target consumers who may use a payment account for a large purchase, obtain rewards for their purchases, and use their rewards within a specified amount of time after obtaining them. Accordingly, not only will consumers be able to receive an optimal payment account, but account providers may also be able to obtain an optimal consumer base as well.

In block 310, the auction module 210 performs a series of calculations to determine an optimal payment account based on consumer preferences, current consumer financial situation data, and the account terms. The calculations of the auction module 210 may determine a FIW score for each account (both existing and new) and the account with the highest (or lowest) FIW score may be deemed the optimal account and designated with FIW status. As mentioned above, the account terms may be weighted according to consumer preferences and/or current consumer financial situation data, such that the payment account with the most desirable account terms specific to a consumer is designated the status of FIW. For example, where consumer preferences indicate that the consumer would like to maximize rewards, but the current consumer financial situation data indicates that the account balance on an account that would maximize rewards would result in a higher cost due to the account balance, available funding across accounts, and an account interest rate and/or fees, the auction module 210 may determine that a different account, with lower rewards but also lower total cost to the consumer may be more beneficial for the consumer. In this example, the account rewards term may be weighted less than the account balance term and account interest rate term based on the current consumer financial situation data. The auction module 210 may calculate a FIW score for each account (either existing or new) by summing the weighted account terms. A consumer may select to ignore current financial data and simply base the FIW scores on consumer preferences.

In block 312, the auctioneer communicates the FIW scores associated with the consumer payment account to the consumer. The consumer may prefer that the auctioneer simply designate a specific payment account as having a FIW status, in which case, the auctioneer system 102 may communicate the designated FIW payment account and any relevant scores (i.e., the payment account with the optimal terms according to consumer preferences and/or current consumer financial situation data), update payment accounts with a FIW status (block 316) and proceed to allow a consumer to use the FIW account in a payment (block 318). Also, a consumer may wish to confirm or select a payment account to have a designated FIW status based on the scoring data determined in the auction module 120. If so, the auctioneer may communicate the FIW scores to a consumer, and the consumer may select (e.g., click on the payment account) the payment account which the consumer desires to designate with a FIW status.

In block 314, the consumer confirms the FIW status payment account if the consumer's preferences indicate that the consumer would like to confirm FIW status associated with a payment account before the status is saved to the payment account. Once confirmed, in block 316, the FIW status associated with a payment account may be updated to reflect whether the account is designated the FIW status. Once a FIW status is associated with a payment account, a consumer may proceed to use the payment account as a FIW payment account (block 318).

Method 400, depicted in FIG. 4, may begin in block 401, where a transaction may be initiated. A transaction may be initiated either by a consumer, in accessing a mobile wallet, or by a merchant, once a consumer desires to checkout any purchases.

In the method depicted in FIG. 4, the auction module 120 may be utilized in an on-demand setting. In other words, a FIW status may be auctioned and new payment terms may be requested every time a consumer desires to make a purchase. In this manner, data specific to the purchase may be used in the auction module 120 and provided by the merchant 108, in order to determine a FIW status.

In block 404, once a consumer has initiated a transaction through a checkout, a consumer may select whether to use a current FIW payment account or determine a new payment account to associate with a FIW status. A consumer may provide a preference, stored in a consumer database 122, to always determine a new payment account to associate with a FIW status. A consumer may also be prompted, via, for example, a mobile device 104, to make this decision.

If a consumer selects to determine a new payment account to associate with a FIW status, an auctioneer system 102 may request new terms from account providers 110 for each payment account associated with the consumer. In the event that an account provider cannot, or does not wish to, update account terms, the most recent account terms may be used in the auction module 120.

Once new payment terms (or most recent payment terms) are provided, the auction module 120 may use consumer preferences, current consumer financials situation data, and any other consumer data stored in the consumer database, any account data stored in the account database, as well as merchant data received from the merchant, such as merchant location, transaction amount, date and time, and any merchant discounts offered, to determine a FIW score for each payment account. As explained in FIG. 3, a consumer may desire to have the auctioneer automatically select a payment account with which to associate a FIW status, or the consumer may desire to select a payment account to associate a FIW with based off of the FIW scores.

Once a payment account is associated with a FIW status, at block 410 the account provider associated with the FIW payment account is provided the transaction information for payment. Payment methods using different account providers may vary. In one example, payment methods may include authorization of the payment by the account providers as illustrated in, for example, FIG. 1A. Also, the auction module 120 may predetermine authorization. If authorization is required, once the FIW payment account provider authorizes the transaction, in block 412, the authorization is processed, in block 414, and the method ends (block 416). Authorization and payment may proceed according to FIG. 1A as described above.

Figure 5:
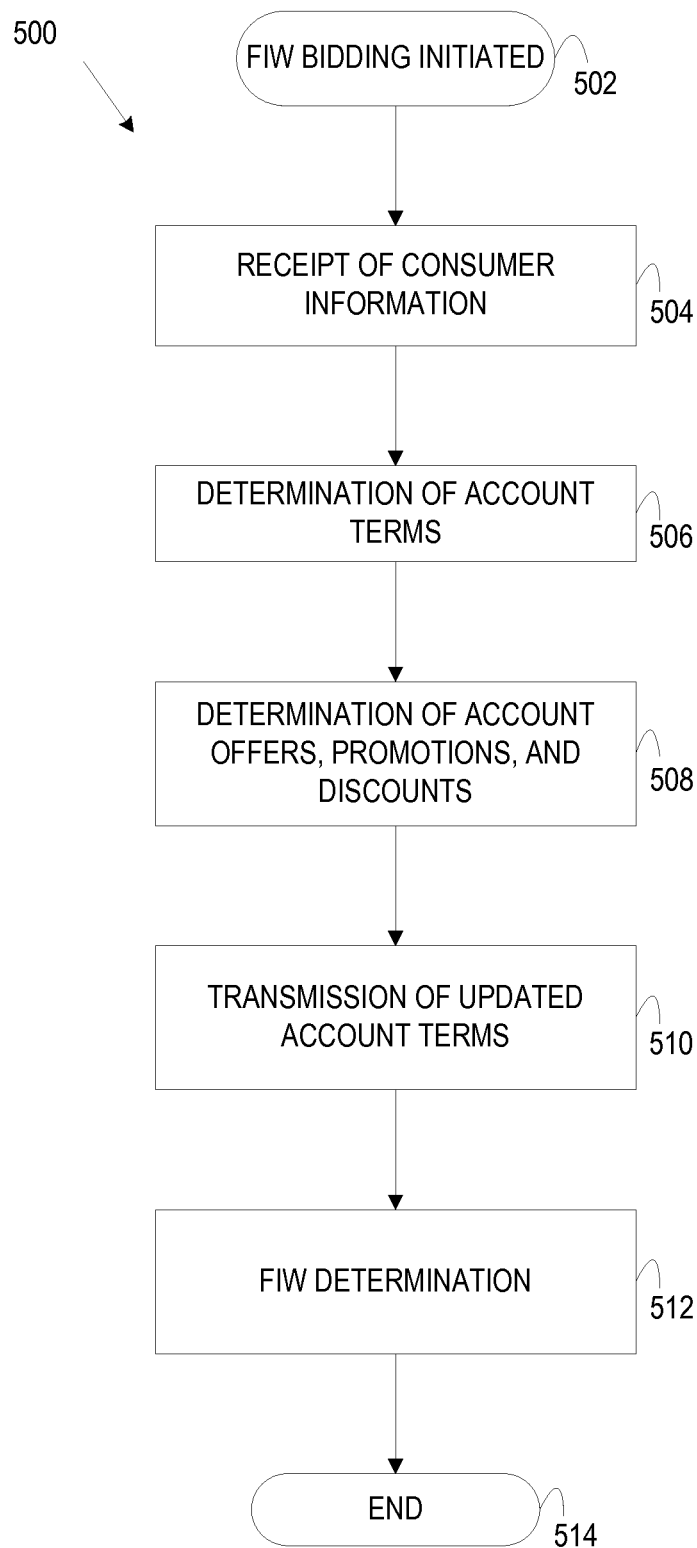
FIG. 5 depicts an exemplary embodiment of a First-In-Wallet determination from the account provider perspective.

Method 500, depicted in FIG. 5, illustrates the FIW determination from the account provider perspective. The process may begin in block 502, where FIW bidding is initiated.

At block 504, account providers may receive consumer information from a variety of sources. Consumer information may be provided from the consumer database 122, the account database 116, the mobile device 104, or from data maintained within the account provider system 110. Any data stored or provided to these locations as previously presented may be utilized by the account providers in the bidding process 500.

At block 506, account terms may be determined. The determination of account terms may be based on, for example, a desired consumer base, previous account terms, and/or consumer desires. A desired consumer base, previous account terms and/or consumer desires may be determined from the consumer information provided in block 504. For example, an account provider may desire a consumer base with a household income of greater than $150,000. In order to achieve this desired consumer base, the account provider may filter, for example, consumer information based on household income to determine other variables that are desired by this group of account, such as, for example, a lower interest rate or higher rewards.

Moreover, previous account terms may be utilized to determine a previous success rate associated with a desired consumer base as well as potential terms to alter in order to expand a desired consumer base.

At block 508, account offers, promotions, and/or discounts may be provided in addition to the account terms. These offers, promotions, and/or discounts may be determined based on the consumer information received as well as, for example, a desired consumer base.

At block 510, the updated account terms (including, for example, any offers, promotions and/or discounts) may be transmitted to the auctioneer 102 for use in the auction module 120. The updated account terms may be stored in the account database 116. Additionally, any new payment account offers, such as a new card application, may be transmitted at block 510.

At block 512, FIW status may be determined by the auction module 120 as discussed above to that a FIW score may be calculated for each account. The FIW scores may then be transmitted to the consumers and/or a consumer device. The process 500 concludes at block 514.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system configured to provide a plurality of payment options for completing a transaction at a later time, the system comprising:
   one or more processors; and
   a memory in communication with the one or more processors and storing instructions that, when executed by the one or more processors, are configured to cause the system to:
      receive, by the one or more processors, a plurality of new terms associated with a plurality of account providers, the plurality of new terms comprising one or more of interest rates, annual percentage rates, account fees, and payment schedules;
      store, in a database and by the one or more processors, the plurality of the new terms associated with the plurality of account providers;
      receive, from a point of sale (POS) device associated with a merchant, financial information associated with a first user and a request for a first plurality of new terms associated with a first plurality of account providers, wherein the plurality of new terms comprise the first plurality of new terms, and wherein the first plurality of new terms enable the first user to pay for the transaction at the later time;
      retrieve, from the database and based on the financial information, the transaction, and the request, the first plurality of new terms associated with the first plurality of account providers;
      calculate, by the one or more processors, a score for each account provider of the first plurality of account providers, the score based on at least the financial information;
      determine a first account provider of the first plurality of account providers with a highest score;
      automatically cause the POS device to display, via a graphical user interface (GUI), the first plurality of account providers, the first plurality of new terms associated with the first plurality of account providers, and a first status indicator proximate the first account provider, the first status indicator based on the highest score associated with the first account provider;
      receive, from the POS device, an indication that the first user declines the first account provider for completing the transaction at the later time;
      cause the POS device to remove the first status indicator displayed proximate the first account provider;
      determine a second account provider of the first plurality of account providers with a second highest score; and
      automatically cause the POS device to display, via the GUI, the first plurality of account providers, the first plurality of new terms associated with the first plurality of account providers, and a second status indicator proximate the second account provider, the second status indicator based on the second highest score associated with the second account provider.

2. The system of claim 1, wherein the financial information comprises at least one of: demand deposit account data, funding availability data, bill payments due, purchase history associated with the bill payments due, credit score, expected date of a new deposit, expected date of new withdrawal, payment account provider ratings, or payment account provider reviews.

3. The system of claim 1, further comprising:
   receive, from the POS device associated with the merchant, consumer preference data associated with the first user,
      wherein retrieving the first plurality of new terms associated with the first plurality of account providers is further based on the consumer preference data.

4. The system of claim 3, wherein the consumer preference data comprises a preference associated with at least one of: speed of payment, merchant discount rate, purchase history, length of repayment, level of interest in improving a credit score, level of acceptance of potential financing charges or interest rates, customer service, length of account loyalty, account rewards, account terms, reward terms, interest rates, late fees, current account status, or fees associated with an account.

5. The system of claim 1, wherein determining the first account provider of the first plurality of account providers with the highest score is based in part on a promotion associated with a current transaction.

6. The system of claim 5, wherein the promotion is based on at least one of: a transaction history of the first user with a particular merchant, a transaction frequency of the first user associated with a particular merchant, or transaction location data of the first user associated with a particular merchant.

7. A point of sale (POS) device comprising:
one or more processors; and
a memory in communication with the one or more processors and storing instructions that, when executed by the one or more processors, are configured to cause the device to:
receive, via a first graphical user interface (GUI), a first user selection to complete a transaction at a later time;
receive financial information of a user associated with the transaction;
transmit, based on the transaction and the financial information, a request for one or more new terms associated with one or more account providers, the one or more new terms comprising one or more of interest rates, annual percentage rates, account fees, and payment schedules;
receive, based on the request, the one or more account providers and the one or more new terms associated with the one or more account providers;
display, via a second GUI, the one or more account providers, the one or more new terms, and a first status indicator proximate a first account provider of the one or more account providers, wherein the first status indicator is based on a first score associated with the first account provider, and wherein the first score is based on at least the financial information;
receive, via the second GUI, a second user selection indicating the user declining to use the first account provider for completing the transaction at the later time;
remove, via the second GUI, the first status indicator proximate the first account provider;
receive, via the second GUI, a third user selection of a second account provider of the one or more account providers;
display, via the second GUI, the one or more account providers, the one or more new terms, and a second status indicator proximate the second account provider of the one or more account providers, wherein the second status indicator is based on a second score associated with the second account provider, and wherein the second score is based on at least the financial information; and
receive, via the second GUI, a fourth user selection indicating the user accepting to use the second account provider for completing the transaction at the later time.

8. The device of claim 7, wherein the financial information comprises at least one of: demand deposit account data, funding availability data, bill payments due, purchase history associated with the bill payments due, credit score, expected date of a new deposit, expected date of new withdrawal, payment account provider ratings, or payment account provider reviews.

9. The device of claim 7, further comprising:
receive consumer preference data of the user associated with the transaction,
wherein transmitting the request for the one or more new terms associated with the one or more account providers is further based on the consumer preference data.

10. The device of claim 9, wherein the consumer preference data comprises a preference associated with at least one of: speed of payment, merchant discount rate, purchase history, length of repayment, level of interest in improving a credit score, level of acceptance of potential financing charges or interest rates, customer service, length of account loyalty, account rewards, account terms, reward terms, interest rates, late fees, current account status, or fees associated with an account.

11. The device of claim 9, wherein the first score and the second score are further based on the consumer preference data.

12. The device of claim 7, wherein the first score and the second score are further based in part on a promotion associated with a current transaction.

13. The device of claim 12, wherein the promotion is based on at least one of: a transaction history of the user with a particular merchant, a transaction frequency of the user associated with a particular merchant, or transaction location data of the user associated with a particular merchant.

14. A device comprising:
one or more processors; and
a memory in communication with the one or more processors and storing instructions that, when executed by the one or more processors, are configured to cause the device to:
receive, via a graphical user interface (GUI), a first user selection to complete a transaction at a later time;
receive financial information of a user associated with the transaction;
transmit, based on the transaction and the financial information, a request for one or more new terms associated with one or more account providers, the one or more new terms comprising one or more of interest rates, annual percentage rates, account fees, and payment schedules;
receive, based on the request, the one or more account providers and the one or more new terms associated with the one or more account providers;
display, via the GUI, the one or more account providers, the one or more new terms, and a first status indicator proximate a first account provider of the one or more account providers, wherein the first status indicator is based on a first score associated with the first account provider;
receive, via the GUI, a second user selection of a second account provider of the one or more account providers;
remove, via the GUI, the first status indicator proximate the first account provider;
display, via the GUI, the one or more account providers, the one or more new terms, and a second status indicator proximate the second account provider of the one or more account providers, wherein the second status indicator is based on a second score associated with the second account provider; and receive, via the GUI, a third user selection indicating the user accepting to use the second account provider for completing the transaction at the later time.

15. The device of claim 14, wherein the financial information comprises at least one of: demand deposit account data, funding availability data, bill payments due, purchase history associated with the bill payments due, credit score, expected date of a new deposit, expected date of new withdrawal, payment account provider ratings, or payment account provider reviews.

16. The device of claim 14, wherein the first score and the second score are based on at least the financial information.

17. The device of claim 16, wherein the first score and the second score are further based in part on a promotion associated with a current transaction, the promotion based on at least one of: a transaction history of the user with a particular merchant, a transaction frequency of the user associated with a particular merchant, or transaction location data of the user associated with a particular merchant.

18. The device of claim 16, further comprising:
receive consumer preference data of the user associated with the transaction,
wherein transmitting the request for the one or more new terms associated with the one or more account providers is further based on the consumer preference data.

19. The device of claim 18, wherein the consumer preference data comprises a preference associated with at least one of: speed of payment, merchant discount rate, purchase history, length of repayment, level of interest in improving a credit score, level of acceptance of potential financing charges or interest rates, customer service, length of account loyalty, account rewards, account terms, reward terms, interest rates, late fees, current account status, or fees associated with an account.

20. The device of claim 18, wherein the first score and the second score are further based on the consumer preference data.

* * * * *